(12) United States Patent
Imanishi

(10) Patent No.: US 11,792,030 B2
(45) Date of Patent: Oct. 17, 2023

(54) CONFERENCE SUPPORT APPARATUS, CONFERENCE SUPPORT METHOD, AND COMPUTER-READABLE RECORDING MEDIUM STORING CONFERENCE SUPPORT PROGRAM

(71) Applicant: SHARP KABUSHIKI KAISHA, Sakai (JP)

(72) Inventor: Seiji Imanishi, Sakai (JP)

(73) Assignee: SHARP KABUSHIKI KAISHA, Sakai (JP)

(*) Notice: Subject to any disclaimer, the term of this patent is extended or adjusted under 35 U.S.C. 154(b) by 0 days.

(21) Appl. No.: 17/849,490

(22) Filed: Jun. 24, 2022

(65) Prior Publication Data
US 2023/0012419 A1   Jan. 12, 2023

(30) Foreign Application Priority Data
Jul. 8, 2021 (JP) .................... 2021-113690

(51) Int. Cl.
*H04L 12/18* (2006.01)
*G06F 40/10* (2020.01)

(52) U.S. Cl.
CPC .......... *H04L 12/1822* (2013.01); *G06F 40/10* (2020.01); *H04L 12/1831* (2013.01)

(58) Field of Classification Search
CPC .. H04L 12/1822; H04L 12/1831; G06F 40/10
See application file for complete search history.

(56) References Cited

U.S. PATENT DOCUMENTS

| 11,379,799 | B1* | 7/2022 | Budkiewicz | H04L 67/60 |
| 2018/0007100 | A1* | 1/2018 | Krasadakis | G06Q 10/1095 |
| 2019/0342107 | A1* | 11/2019 | Vogel | H04L 12/1822 |
| 2021/0056450 | A1* | 2/2021 | Catalano | G06Q 10/1095 |
| 2021/0399911 | A1* | 12/2021 | Jorasch | H04L 65/403 |

FOREIGN PATENT DOCUMENTS

JP   2009-265716 A   11/2009

* cited by examiner

*Primary Examiner* — John A Follansbee
*Assistant Examiner* — Raqiul A Choudhury
(74) *Attorney, Agent, or Firm* — ScienBiziP, P.C.

(57) ABSTRACT

A conference support apparatus includes an acquirer, an acceptor, a determiner, and an outputter. The acquirer acquires, for each predetermined member, related information including an evaluation value representing the association between a predefined word representing the classification of a conference and the member. The acceptor accepts input of information regarding a conference to be held and a member selected from the predetermined members as a potential participant of the conference to be held. The determiner determines whether or not a member who is a potential participant is suitable as a conference participant of the conference to be held, on the basis of the related information corresponding to the potential participant and the information regarding the conference to be held. The outputter outputs the determination result of the determiner.

6 Claims, 11 Drawing Sheets

| MEETING ID | MEMBER NAME | DATE AND TIME | CONFERENCE PARTICIPANT |
|---|---|---|---|
| 1 | PROJECT X | MAY 10, 15:00 | A、B・・・ |
| 2 | PROJECT Z | MAY 18, 10:00 | A、B、C・・・ |
| 3 | PROJECT X_PRODUCT 1 | MAY 25, 9:30 | A、B・・・ |
| 4 | PROJECT X_PRODUCT 2 | JUNE 1, 9:30 | C、D・・・ |
| 5 | PROJECT Y_SERVICE 1 | JUNE 5, 10:00 | B、C・・・ |
| 6 | PROJECT Z_PRODUCT 3 | JUNE 6, 9:30 | A、C、D・・・ |
| 7 | PROJECT X_PRODUCT 1 | JUNE 10, 14:00 | A、B・・・ |

| RELATED INFORMATION ID: Ha | | KEYWORD | | | |
|---|---|---|---|---|---|
| MEETING ID | CONFERENCE NAME | PROJECT X | PROJECT Y | PROJECT Z | ・・・ |
| 1 | OF PROJECT X | 1 | 0.9 | 0.9 | ・・・ |
| 2 | ABOUT PROJECT Z | 0.9 | 0.81 | 0.9 | ・・・ |
| 3 | PROJECT X_PRODUCT 1 | 0.9 | 0.729 | 0.81 | ・・・ |
| 6 | PROJECT Z_PRODUCT 3 | 0.81 | 0.656 | 0.81 | ・・・ |
| 7 | PROJECT X_PRODUCT 1 | 0.81 | 0.590 | 0.729 | ・・・ |

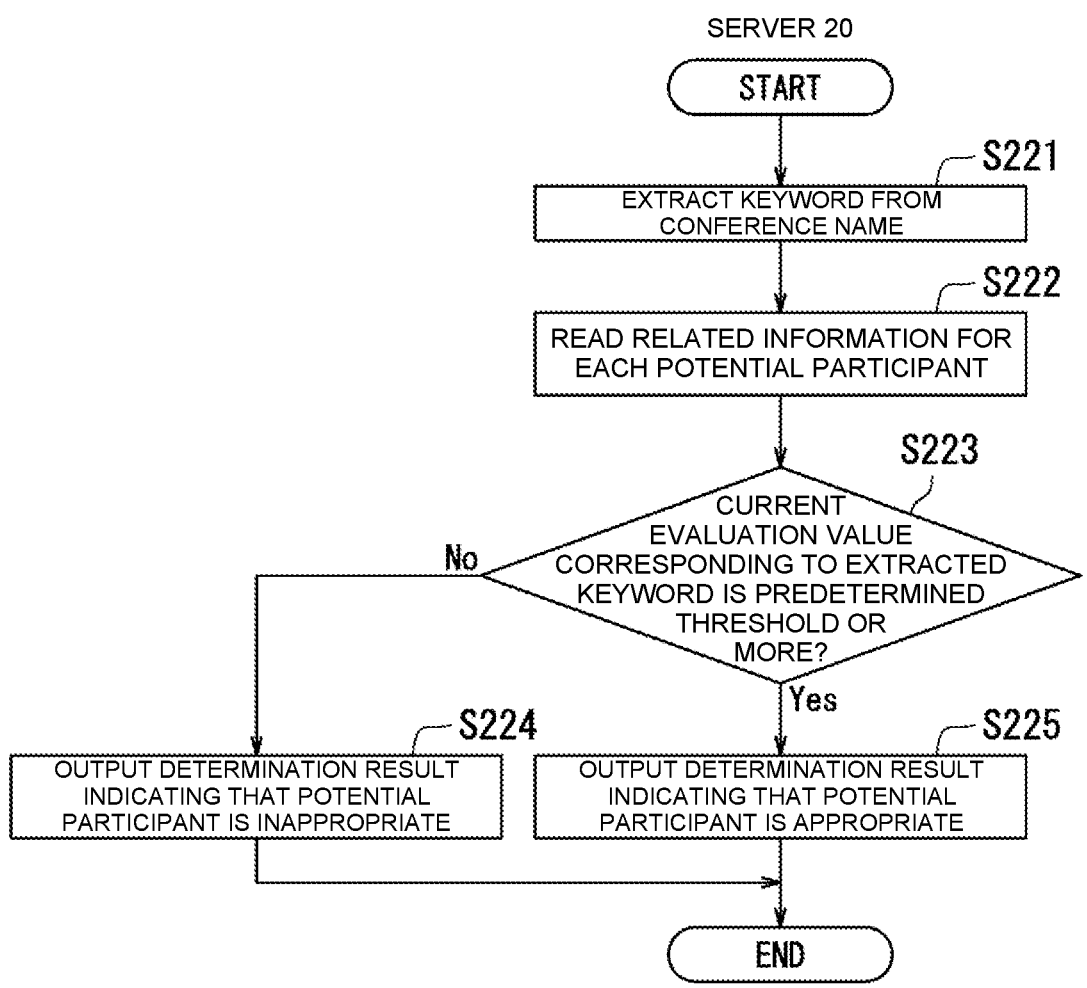

| CONFERENCE ID | MEMBER NAME | DATE AND TIME | CONFERENCE PARTICIPANT |
|---|---|---|---|
| 1 | PROJECT X | MAY 10, 15:00 | A, B ··· |
| 2 | PROJECT Z | MAY 18, 10:00 | A, B, C ··· |
| 3 | PROJECT X_PRODUCT 1 | MAY 25, 9:30 | A, B ··· |
| 4 | PROJECT X_PRODUCT 2 | JUNE 1, 9:30 | C, D ··· |
| 5 | PROJECT Y_SERVICE 1 | JUNE 5, 10:00 | B, C ··· |
| 6 | PROJECT Z_PRODUCT 3 | JUNE 6, 9:30 | A, C, D ··· |
| 7 | PROJECT X_PRODUCT 1 | JUNE 10, 14:00 | A, B ··· |
| 8 | ABOUT PROJECT X | JUNE 25, 15:00 | A, B, D, F |

| RELATED INFORMATION ID: Ha | | KEYWORD | | | |
|---|---|---|---|---|---|
| CONFERENCE ID | CONFERENCE NAME | PROJECT X | PROJECT Y | PROJECT Z | ··· |
| 1 | OF PROJECT X | 1 | 0.9 | 0.9 | ··· |
| 2 | ABOUT PROJECT Z | 0.9 | 0.81 | 0.9 | ··· |
| 3 | PROJECT X_PRODUCT 1 | 0.9 | 0.729 | 0.81 | ··· |
| 6 | PROJECT Z_PRODUCT 3 | 0.81 | 0.656 | 0.81 | ··· |
| 7 | PROJECT X_PRODUCT 1 | 0.81 | 0.590 | 0.729 | ··· |
| 8 | ABOUT PROJECT X | $0.81(=0.81 \times 1)$ | $0.531(=0.59 \times 0.9)$ | $0.656(=0.729 \times 0.9)$ | ··· |

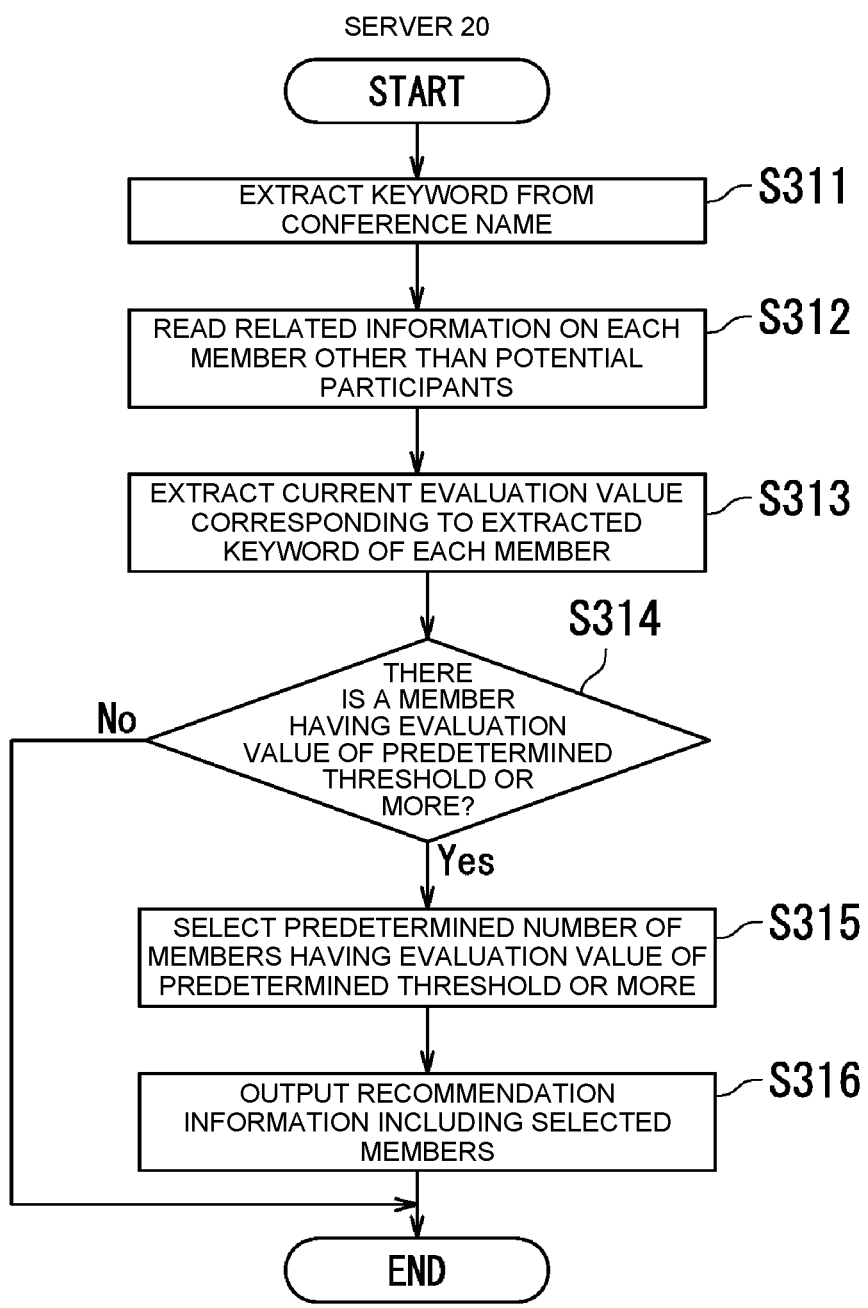

CONFERENCE SUPPORT APPARATUS, CONFERENCE SUPPORT METHOD, AND COMPUTER-READABLE RECORDING MEDIUM STORING CONFERENCE SUPPORT PROGRAM

INCORPORATION BY REFERENCE

The present application claims the benefit of priority under 35 U.S.C. 119 based on Japanese Patent Application No. 2021-113690 filed on Jul. 8, 2021, and the disclosure of which is incorporated herein by reference in its entirety.

BACKGROUND

The disclosure relates to a conference support apparatus, a conference support method, and a conference support program.

Japanese Patent Application No. 2009-265716 discloses a conference support server that extracts potential conference participants that match the input conference request and sends a conference invitation to the extracted potential conference participants. The conference support server stores a profile for each potential conference participant, which includes information elements such as the affiliation and position of the potential conference participant. The conference support server refers to the profile of each potential conference participant and sets the potential conference participants having information elements that match a term used in the conference name specified in the conference request, as member who are attending the conference.

SUMMARY

The conference support apparatus according to the disclosure includes an acquirer, an acceptor, a determiner, and an outputter. The acquirer acquires, for each predetermined member, related information including an evaluation value representing the association between a predefined word representing the classification of a conference and the member. The acceptor accepts input of information regarding a conference to be held and a member selected from the predetermined members as a potential participant of the conference to be held. The determiner determines whether or not a member who is a potential participant is suitable as a conference participant of the conference to be held, on the basis of the related information corresponding to the potential participant and the information regarding the conference to be held. The outputter outputs the determination result of the determiner.

A conference support method according to the disclosure includes an acquisition step, an acceptance step, a determination step, and an output step. The acquisition steps acquires, for each predetermined member, related information including an evaluation value representing the association between a predefined word representing the classification of the conference and the member. The acceptation step accepts input of information regarding a conference to be held and a member selected from the predetermined members as a potential participant of the conference to be held. The determination step determines whether or not a member who is a potential participant is suitable as a conference participant of the conference to be held, on the basis of the related information corresponding to the potential participant accepted as input and the information regarding the conference accepted as input. The output step outputs the determination result of the determination step.

A computer-readable recording medium storing a conference support program according to the disclosure is a non-temporary tangible computer-readable recording medium storing a program for causing a computer to execute a process. The process includes acquiring, for each predetermined member, related information including an evaluation value representing the association between a predefined word representing the classification of the conference and the member; accepting input of information regarding a conference to be held and a member selected from the predetermined members as a potential participant of the conference to be held; determining whether or not the member who is a potential participant is suitable as a conference participant of the conference to be held, on the basis of the related information corresponding to the potential participant accepted as input and the information regarding the conference to be held accepted as input; and outputting a determination result.

BRIEF DESCRIPTION OF THE DRAWINGS

FIG. 5C illustrates an example of data in a conference information DB.

FIG. 5D illustrates an example of data in a related information DB.

FIG. 7 is an operation flow of a determination process by a server 20 according to the first embodiment.

FIG. 9A illustrates the updated state of the conference information DB illustrated in FIG. 5C.

FIG. 9B illustrates the updated state of the related information DB illustrated in FIG. 5D.

FIG. 10B is an operation flow of a recommendation process by a server according to the second embodiment.

DETAILED DESCRIPTION

Figure 1:
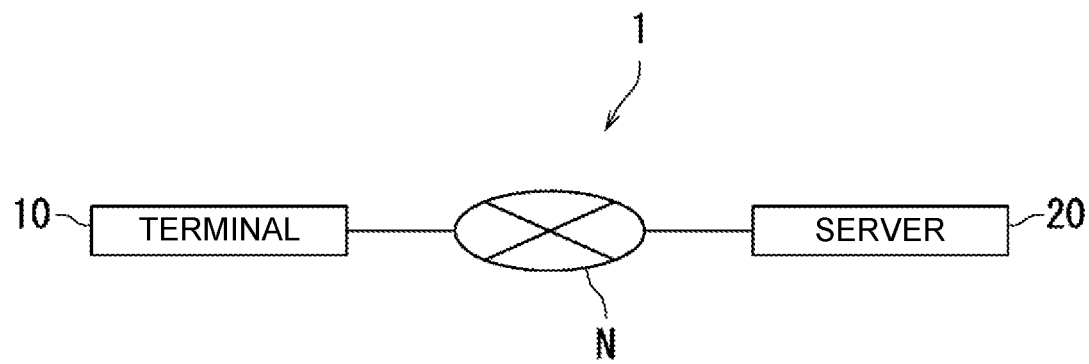
FIG. 1 is a schematic diagram illustrating a structure of a conference support apparatus according to a first embodiment.

A conference support apparatus, a conference support method, and a conference support program according to the embodiments will now be described with reference to the accompanying drawings. In the drawings, the same reference signs are given to the same or similar components and the description of such components will not be repeated.

First Embodiment

FIG. 1 is a schematic diagram illustrating the structure of a conference support apparatus 1 according to the present embodiment. As illustrated in FIG. 1, the conference support apparatus 1 includes a terminal 10 and a server 20. In the present embodiment. the terminal 10 may be a device such as a personal computer (PC), a tablet terminal, or a smartphone. The terminal 10 and the server 20 are connected via a communication network N, such as a local area network (LAN), a wide area network (WAN), or the Internet. The number of terminals 10 connected to the server 20 is not limited to one, but may be two or more. The server 20 accepts, via the terminal 10, input of conference information regarding a conference including the conference name and potential participants of the conference and determines whether the potential participants are suitable or not. Each specific structure will now be described in detail.

Terminal 10

Figure 2:
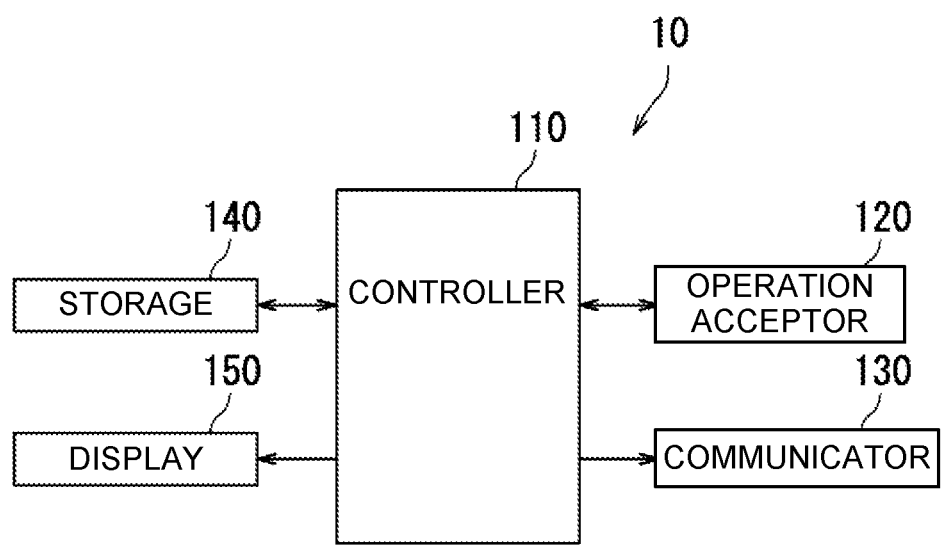
FIG. 2 is a block diagram illustrating a schematic structure of a terminal according to the first embodiment.

FIG. 2 is a block diagram illustrating a schematic structure of the terminal 10 according to the present embodiment. As illustrated in FIG. 2, the terminal 10 includes a controller 110, an operation acceptor 120, a communicator 130, a storage 140, and a display 150.

The operation acceptor 120 (an example of an acceptor) includes a keyboard, mouse, etc. The operation acceptor 120 accepts various input operations such as input operations of conference information regarding conferences.

The communicator 130 is a communication interface for communicating with the server 20 via the communication network N and is in accordance with a predetermined communication standard. The communicator 130 exchanges data with the server 20 under the control of the controller 110.

Figure 3:
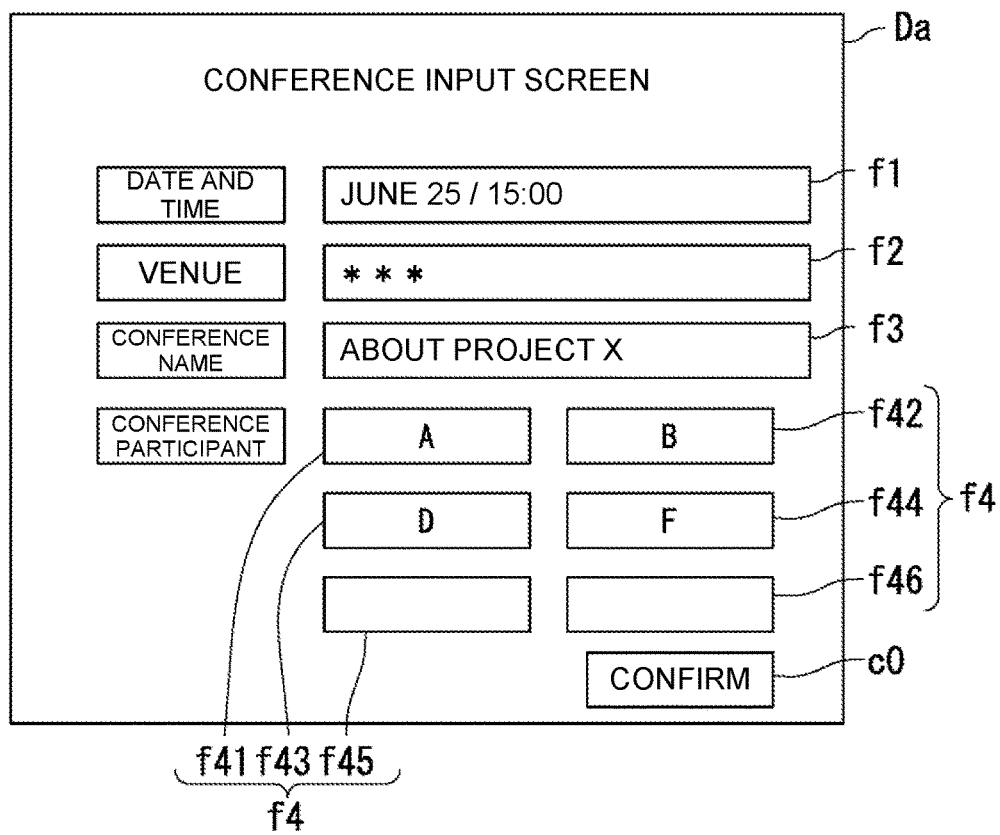
FIG. 3 is a schematic diagram illustrating an example of a conference input screen.

The display 150 includes a display. The display 14 displays various screens including a conference input screen, under the control of the controller 110. FIG. 3 is a schematic diagram illustrating an example of a conference input screen Da. As illustrated in FIG. 3, the conference input screen Da contains input fields f1 to f4 respectively labeled as "date and time," "venue," "conference name," and "conference participants," and a confirmation icon C0 with the word "confirm."

Referring back to FIG. 2, the storage 140 includes a nonvolatile storage medium, such as a hard disc. The storage 140 stores image data and other data for displaying various screens.

The controller 110 includes a central processing unit (CPU) and a memory (read only memory (ROM) and random access memory (RAM)). The controller 110 controls the components by executing control programs (examples of a conference support program) stored in the ROM by the CPU.

Specifically, the controller 110 causes the display 150 to display the conference input screen Da in response to a predetermined operation via the operation acceptor 120, and accepts input of conference information on the conference input screen Da (FIG. 3). The controller 110 inquires the server 20 about the suitability of the potential participants input to the input fields f4 as conference participants in response to the confirmation icon C0 being pressed on the conference input screen Da, and receives the determination result on the suitability of the conference participants from the server 20. The controller 110 transitions the screen on the display 150 in accordance with the determination result from the server 20.

Server 20

Figure 4:
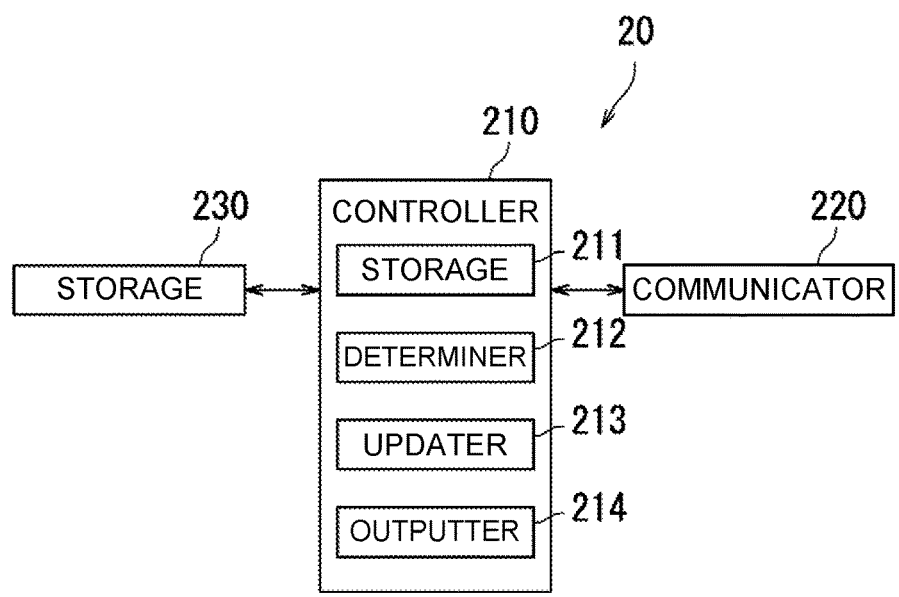
FIG. 4 is a block diagram illustrating a schematic structure of a server according to the first embodiment.

FIG. 4 is a block diagram illustrating a schematic structure of the server 20 according to the present embodiment. As illustrated in FIG. 4, the server 20 includes a controller 210, a communicator 220, and a storage 230.

The communicator 220 is a communication interface for communicating with the terminal 10 via the communication network N and is in accordance with a predetermined communication standard.

The storage 230 includes a nonvolatile storage medium, such as a hard disc. The storage 230 stores data such as a member information DB 410, a keyword DB 420, a conference information DB 430, and a related information DB 411, illustrated in FIGS. 5A to 5D.

Figure 5A:
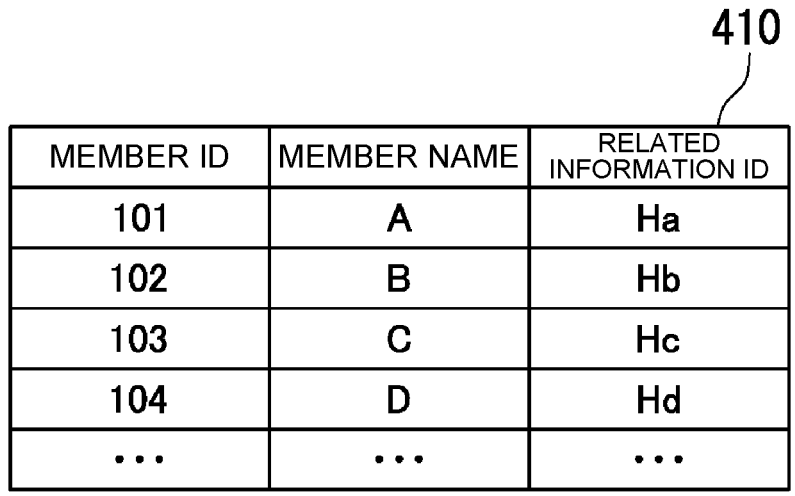
FIG. 5A illustrates an example of data in a member information DB.

FIG. 5A illustrates an example of data in the member information DB 410. As illustrated in FIG. 5A, the member information DB 410 stores member information associated with data items indicating member IDs, member names, and related information IDs. A member ID is identification information that is uniquely assigned to each member. A member name is, for example, the full name of a member. A related information ID is information for identifying related information stored in the related information DB 411. The member information DB 410 may store contact information such as e-mail addresses for each member.

Figure 5B:
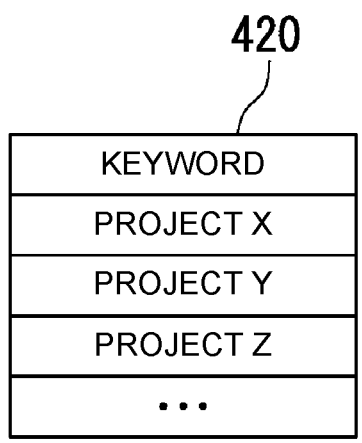
FIG. 5B illustrates an example of data in a keyword DB.

FIG. 5B illustrates an example of data in the keyword DB 320. As illustrated in FIG. 5B, the keyword DB 320 stores multiple keywords different from each other. In the present embodiment, a keyword is a word used, for example, in the conference name and is preset by the administrator. A keyword is an example of a word representing the classification of a conference. In FIG. 5B, "project X," "project Y," "project Z," etc. are set as keywords.

FIG. 5C illustrates an example of data in the conference information DB 430. As illustrated in FIG. 5C, the conference information DB 430 stores conference information associated with data items indicating conference IDs, conference names, dates and times, and conference participants.

FIG. 5D illustrates an example of data in the related information DB 411. The related information DB 411 stores, for each related information ID, evaluation values of the keywords stored in the keyword DB 420. FIG. 5D illustrates the related information of a related information ID "Ha," i.e., a member name "A" (hereinafter referred to as member A) (see FIG. 5A). The related information DB 411 stores the related information of members other than the member A in the same manner as that of the member A.

The items "conference ID" and "conference name" in the related information DB 411 store the conference ID and the conference name of the conference for which member A is registered as a conference participant (hereinafter referred to as participating conference) in the conference information stored in the conference information DB 430. An evaluation value of a keyword is set in accordance with whether or not a keyword is included in the conference name of the conference to be attended. The evaluation value in the last row for each keyword in the related information DB 411 is the most recent evaluation value (current evaluation value) for that keyword. In the present embodiment, the evaluation value is a numerical value greater than zero and equal to or smaller than one. The evaluation values of the keywords are updated every time the member A attends a conference.

Referring back to FIG. 4, the controller 210 includes a CPU and memory (ROM and RAM). The controller 210 functions as an acquirer 211, a determiner 212, an updater 213, and an outputter 214 as a result of the CPU executing control programs (examples of a conference support program) stored in the ROM.

The acquirer 211 acquires inquiry information, conference information, etc. from the terminal 10 via the communicator 220.

The determiner 212 determines the suitability of potential participants on the basis of the inquiry information acquired by the acquirer 211, the member information DB 310, and the related information DB 411.

The updater 213 updates the conference information DB 430 and the related information DB 411 on the basis of the conference information acquired by the acquirer 211.

The outputter 214 outputs the result determined by the determiner 212 to the terminal 10 via the communicator 220.

Operation

Figure 6:
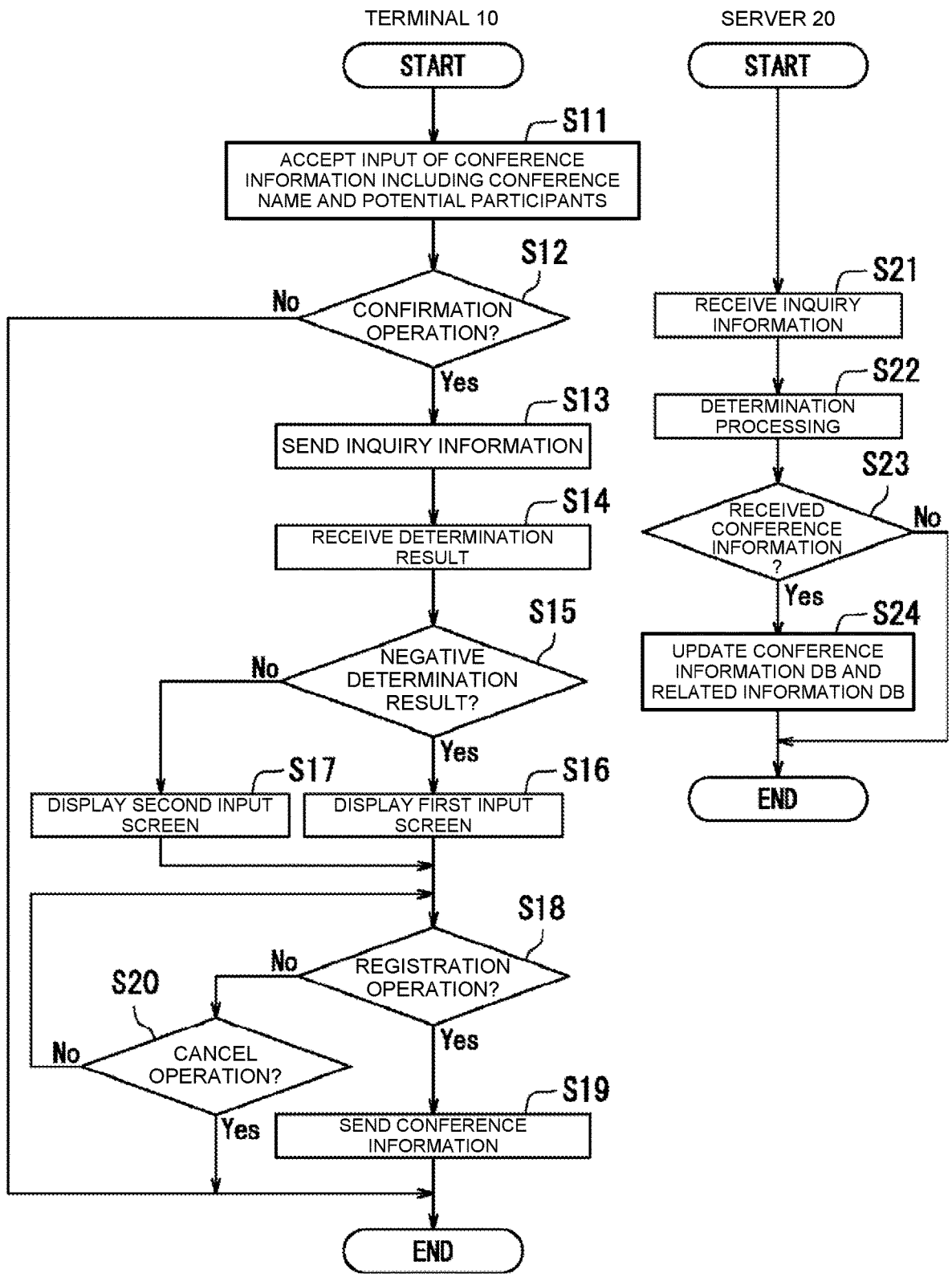
FIG. 6 is an operational flow of a conference registration process by the conference support apparatus according to the first embodiment.

The operation of the conference support apparatus 1 during a conference registration process will now be described. FIG. 6 is an operational flow of the conference registration process performed by the conference support apparatus 1 according to the present embodiment. The process by the terminal 10 in FIG. 6 starts from a state in which the display 150 displays the conference input screen Da (FIG. 3) as a result of a predetermined operation. The conference registration process will now be described with reference to FIGS. 1 to 6.

The terminal 10 accepts input of conference information including a conference name and potential participants on the conference input screen Da (FIG. 3) displayed on the display 150 via the operation acceptor 120 (step S11). Specifically, the controller 110 accepts input of the date and time, the venue, the conference name, and the conference participants (potential participants) to the input fields f1 to f4 on the conference input screen Da via the operation acceptor 120.

When the terminal 10 accepts an pressing operation of the confirmation icon C0 on the conference input screen Da via the operation acceptor 120 (step S12: yes), the controller 110 generates inquiry information and sends the inquiry information to the server 20 via the communicator 130 (step S13). Specifically, the controller 110 sends, to the server 20, inquiry information including the conference name "About project X" input to the input field f3 on the conference input screen Da and the potential participants "A," "B," "D," and "F" input to the input fields f4 as conference participants, and inquires the server 20 about the suitability of the potential participants. If the terminal 10 does not accept a pressing operation of the confirmation icon C0 via the operation acceptor 120 in step S12 (step S12: no), the conference registration process ends.

The server 20 receives the inquiry information from the terminal 10 via the communicator 220 (step S21). The server 20 then causes the controller 210 to perform a process of determining the suitability of the potential participants on the basis of the received inquiry information (step S22).

FIG. 7 is an operation flow of a determination process by the server 20 according to the present embodiment. The server 20 causes the controller 210 to refer to the keyword DB 420 stored in the storage 230 and extract a keyword from the conference name included in the inquiry information (step S221). Hereinafter, the keywords that are extracted are referred to as "extracted keywords." For example, if the conference name is "About project X," the portion "project X," which matches the keyword "project X" in the keyword DB 420, is extracted.

The server 20 causes the controller 210 to read the related information (FIG. 5D) for each potential participant in the inquiry information from the related information DB 411 stored in the storage 230 (step S222). The controller 210 then determines whether or not the current evaluation value of the extracted keyword in the related information of each potential participant is equal to or larger than a predetermined threshold value (step S223).

If the current evaluation value of the extracted keyword in the related information of each potential participant is not equal to or larger than the predetermined threshold value (step S223: no), the server 20 outputs the determination result indicating that the potential participant is unsuitable to the terminal 10 via the communicator 220 (step S224).

If the current evaluation value of the extracted keyword in the related information of each potential participant is equal to or larger than the predetermined threshold value (step S223: yes), the server 20 outputs the determination result indicating that the potential participant is suitable to the terminal 10 via the communicator 220 (step S225).

For example, in the related information of the member A illustrated in FIG. 5D, the current evaluation value of the extracted keyword "project X" is "0.81." If the predetermined threshold value is "0.5," the member A is determined to be suitable as a conference participant. The other potential participants "B," "D," and "F" included in the inquiry information are also determined in the same way as the member A. For example, if only the potential participant "F" is unsuitable, a negative determination result including information on the potential participant "F" is output. If all potential participants are suitable, a positive determination result indicating that all potential participants are suitable is output.

Referring back to FIG. 6, the terminal 10 receives the determination result from the server 20 via the communicator 130 (step S14).

Figure 8A:
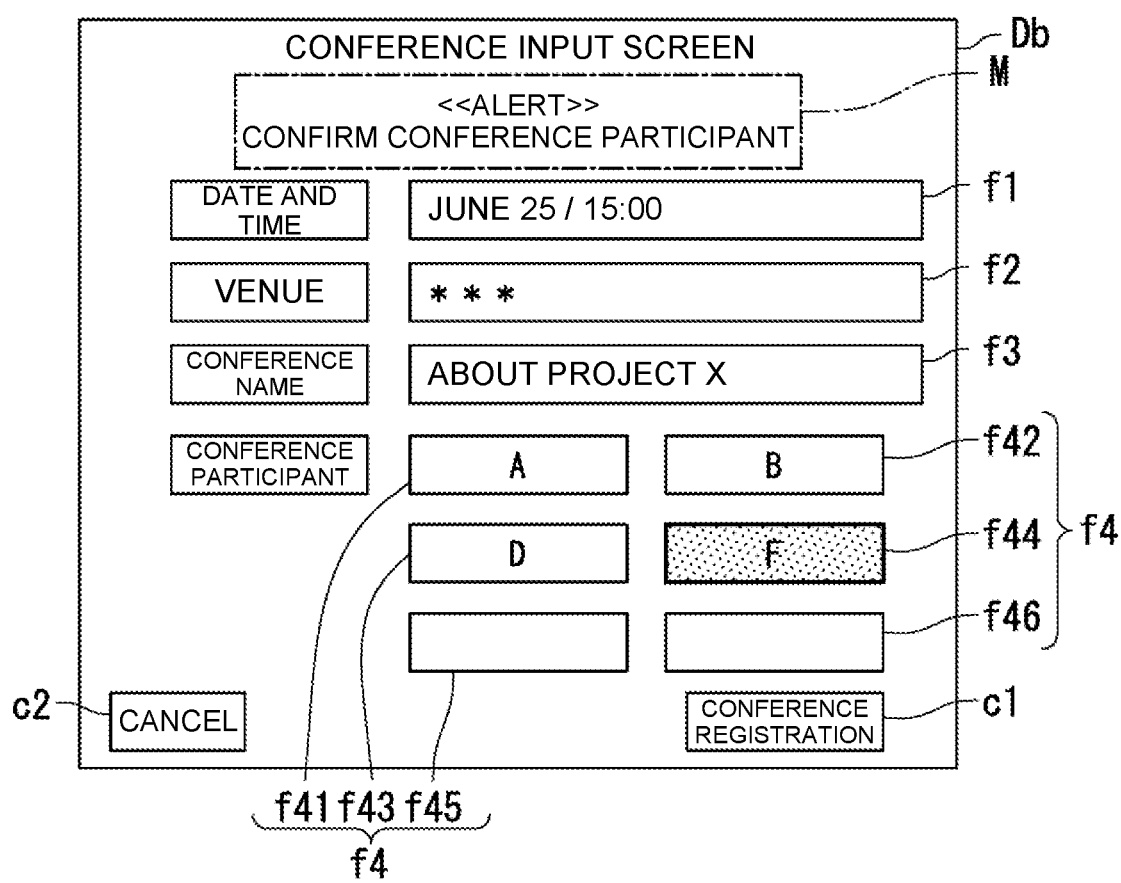
FIG. 8A is a schematic diagram illustrating an example of a first input screen.

If the received determination result is a negative determination result (step S15: yes), the terminal 10 causes the controller 110 to cause the display 150 to display a first input screen Db (step S16). FIG. 8A is a schematic diagram illustrating an example of the first input screen Db. The first input screen Db contains the input fields f1 to f4 of the conference input screen Da illustrated in FIG. 3, a message M prompting the confirmation of the conference participants (potential participants), a registration icon C1 labeled as "conference registration," and a cancellation icon C2 labeled as "cancel." The input field f44 in which the potential participant "F" included in the negative determination result is input is displayed with more emphasis than the other input fields f41 to f43.

Figure 8B:
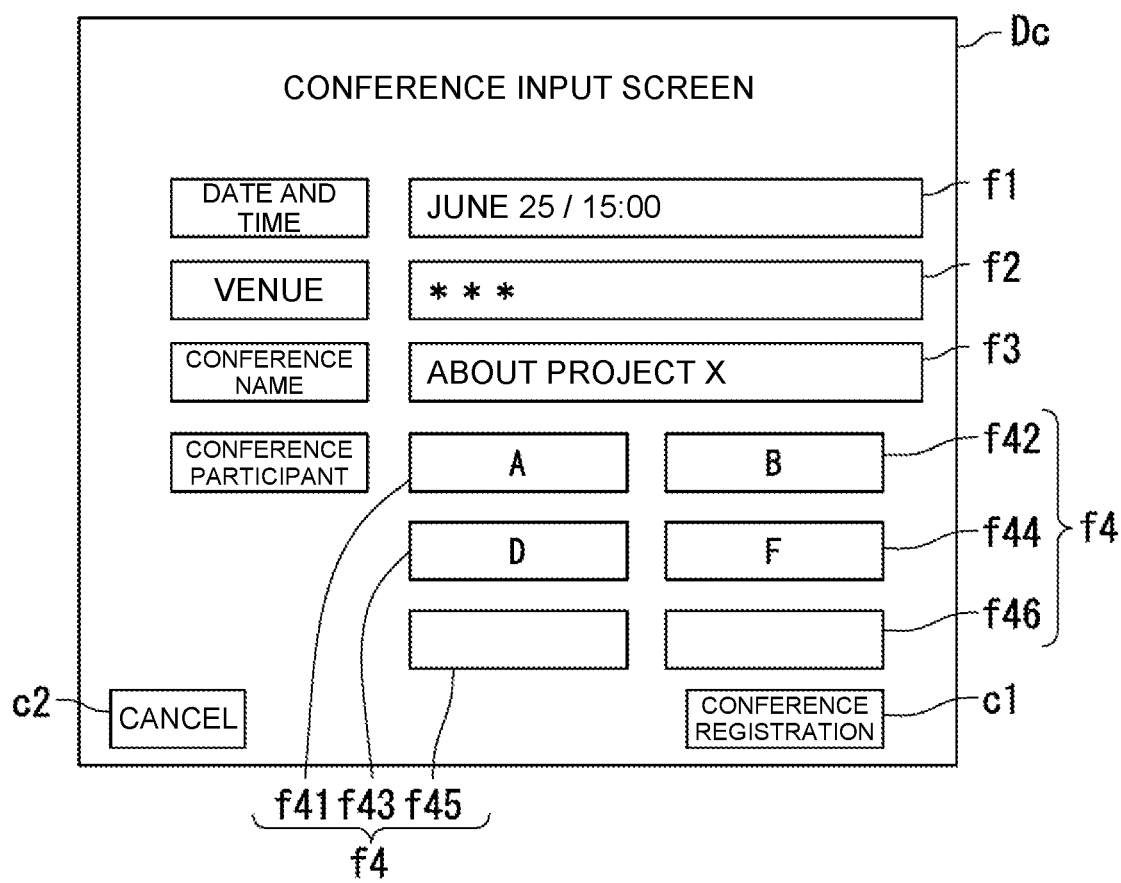
FIG. 8B is a schematic diagram illustrating an example of a second input screen.

If the received determination result is not a negative determination result (step S15: no), the terminal 10 causes the controller 110 to cause the display 150 to display a second input screen Dc (step S17). FIG. 8B is a schematic diagram illustrating an example of the second input screen Dc. The second input screen Dc contains the input fields f1 to f4, of the conference input screen Da illustrated in FIG. 3, the registration icon C1, and the cancellation icon C2.

When the terminal 10 accepts an pressing operation of the registration icon C1 on the first input screen Db or the second input screen Dc via the operation acceptor 120 (step S18: yes), the controller 110 sends the conference information to the server 20 via the communicator 130 (step S19). That is, the conference information including the data items input to the input fields f1 to f4 on the first input screen Db or the second input screen Dc is sent to the server 20.

When the terminal 10 accepts an pressing operation of the cancellation icon C2, not the registration icon C1, on the first input screen Db or the second input screen Dc via the operation acceptor 120 (step S18: no; step S20: yes), the controller 110 ends the conference registration process. Until a pressing operation of the cancellation icon C2 is accepted in step S20 (step S20: no), the terminal 10 enters a standby state in which the first input screen Db or the second input screen Dc is displayed.

When the server 20 receives the conference information from the terminal 10 via the communicator 220 (step S23: yes), the controller 210 updates the conference information DB 430 and the related information DB 411 in the storage 230 (step S24). If the server 20 does not receive the conference information from the terminal 10 via the communicator 220 (step S23: no), the conference registration process is ends.

FIG. 9A illustrates the updated state of the conference information DB 430 illustrated in FIG. 5C. For example, when the server 20 receives the conference information including the data items input to the first input screen Db illustrated in FIG. 8A, the conference information in the bold frame in FIG. 9A is added to the conference information DB 430. That is, a new conference ID "8" is assigned to the conference information received from terminal 10 and added to the conference information DB 430.

FIG. 9B illustrates the updated state of the related information of the member A illustrated in FIG. 5D. For example, when the server 20 receives the conference information including the data items input to the first input screen Db illustrated in FIG. 8A, the related information in the bold frame in FIG. 9B is added to the related information DB 411.

The evaluation value of the keyword "project X" for the newly added conference ID "8" is set to "0.81" obtained by multiplying the most recent evaluation value "0.81" of the keyword "project X" by "1.0." The evaluation values of the keywords "project Y" and "project Z" for the conference ID "8" are "0.531" and "0.656," respectively, and are obtained by multiplying the most recent evaluation value "0.590" of the keyword "project Y" by "0.9" and the most recent evaluation value "0.729" of the keyword "project Z" by "0.9." That is, if the conference name of the conference to be attended includes a keyword, the most recent evaluation value of the keyword is multiplied by "1.0," and if a keyword is not included, the most recent evaluation value of the keyword is multiplied by "0.9."

The evaluation value of each keyword is a value that approaches 1.0 as the number of times the keyword included in the names of all conferences attended by the member A increases, and approaches zero as the number of times the keyword is not included increases. That is, the larger the evaluation value of a keyword, the higher the association between the member A and the keyword, and the smaller the evaluation value of the keyword, the lower the association between the member A and the keyword.

The server 20 may read, from the member information DB 410, the e-mail addresses of the conference participants included in the conference information added to the conference information DB 430 after the processing of step S24, and send a conference invitation e-mail to the read e-mail addresses. The conference invitation e-mail includes at least information indicating the conference name, the date and time, and the venue included in the conference information.

In the present embodiment, when a member having low association with the conference is input to the terminal 10 as a potential participant, a message M (FIG. 8A) is displayed to prompt the confirmation of the potential participant and alerts the user who is setting up the conference. This can prevent members who are not appropriate as conference participants from viewing the conference material and the like.

Second Embodiment

After the suitability of the potential participants is determined in step S22 (FIG. 6), the server 20 may select the members suitable as conference participants from the members not included in the potential participants and present them on the terminal 10.

Figure 10A:
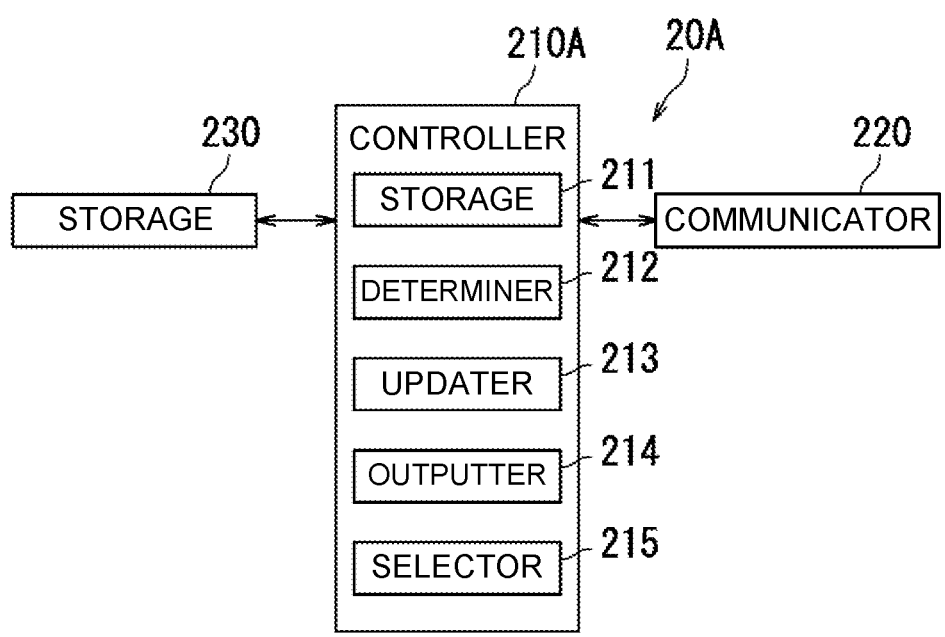
FIG. 10A is a block diagram illustrating a schematic structure of a server according to a second embodiment.

FIG. 10A is a block diagram illustrating a schematic structure of a server 20A according to the present embodiment. In FIG. 10A, the same configurations as the first embodiment are denoted by the same reference numerals as the first embodiment. In the following, configurations different from those of the first embodiment will be mainly described.

As illustrated in FIG. 10A, the server 20A includes a controller 210A. The controller 210A functions as an acquirer 211, a determiner 212, an updater 213, an outputter 214, and a selector 215 as a result of the CPU executing control programs stored in the ROM.

The selector 215 refers to the member information DB 410 and the related information DB 411 stored in the storage 230, and selects a member not included in the potential participants but suitable as a conference participant on the basis of the inquiry information from the terminal 10.

The outputter 214 outputs recommendation information presenting the member selected by the selector 215 as a potential participant to the terminal 10 via the communicator 220.

Operation

FIG. 10B is an operation flow of a recommendation process by the server 20A according to the present embodiment.

After steps S21 and S22 in FIG. 6 have been executed, the server 20A cause the controller 210A to extract a keyword of the keyword DB 420 from the conference names in the inquiry information (step S311). The controller 210A then refers to the member information DB 410 and reads, from the related information DB 411, the related information of members other than the potential participants in the inquiry information (step S312).

The server 20A causes the controller 210A to extract the current evaluation values of the extracted keyword in the read related information of each member (step S313).

If there is a member having a current evaluation value corresponding to the extracted keyword that is equal to or larger than a predetermined threshold value, that is, if a current evaluation value of any member is equal to or larger than the predetermined threshold value (step S314: yes), the server 20A causes the controller 210A to select a predetermined number of members from the members whose evaluation values are equal to or larger than the predetermined threshold value (step S315). Specifically, for example, if the current evaluation value of a member other than the potential participants includes an evaluation value that is equal to or larger than the predetermined threshold value "0.5," the controller 210A selects a predetermined number of members in descending order of evaluation value.

The server 20A outputs the recommendation information including the selected member to the terminal 10 via the communicator 220 (step S316).

After step S14 in FIG. 6, the terminal 10 receives the recommendation information from the server 20A via the communicator 130 and causes the controller 110 to display the members included in the recommendation information on the first input screen Db or the second input screen Dc. The members included in the recommendation information may be displayed in any input fields f4 in which no potential participant has been input, or may be displayed in an area different from the input fields f4 in the first input screen Db or the second input screen Dc. When the members included in the recommendation information are displayed in the input fields f4 in which no potential participants are input, it is preferred that the members are displayed in a manner distinguishable from the other input fields f4 in which the potential participants are input.

In the present embodiment, since the members suitable as conference participants among the members not input to the conference input screen Da as potential participants are presented as conference participants, all conference participants are invited to the conference.

The conference support apparatus, the conference support method, and the conference support program according to the embodiments have been described above. However, the conference support apparatus, the conference support method, and the conference support program are not limited to the above embodiments, and can be implemented in various ways without departing from the gist thereof. For easier understanding, the drawings schematically illustrate mainly individual constituent components of each drawing, and the illustrated constituent components are different from the actual components in thickness, length, number, and the like. The shape, the dimensions, and the like of each component illustrated in the above embodiment are merely examples, and are not particularly limited, and various changes can be made without substantially departing from the effect of the present disclosure. Modifications of the above embodiment are described below.

[Modification]

(1) The conference support apparatus 1 may include only the terminal 10. In such a case, the terminal 10 can have the same functions as the servers 20 and 20A. In such a case, the storage 140 of the terminal 10 stores the member information DB 410, the keyword DB 420, the conference information DB 430, and the related information DB 411. The controller 110 has the same functions as the acquirer 211, the determiner 212, the updater 213, the outputter 214, and the selector 215 of the controller 210, 210A. In other words, the controller 110 of the terminal 10 acquires the conference information including the data input to the conference input screen Da when each data item is input to the conference input screen Da via the operation acceptor 120, and the confirmation icon C0 is pressed. The controller 110 refers to the member information DB 410 and the related information DB 411, determines the suitability of potential participants on the basis of the conference name and potential participants included in the acquired conference information, and performs the recommendation process on the basis of the related information of the members other than the potential participants. The controller 110 causes the display 150 to display the first input screen Db or the second input screen Dc and the potential participants included in the recommendation information in accordance with the determination result of the potential participants. Then, in response to the depressing operation of the registration icon C1 on the first input screen Db or the second input screen Dc, the controller 110 updates the conference information DB 430 and the related information DB 411 on the basis of the conference information including the respective data items input to the first input screen Db or the second input screen Dc.

(2) The conference name input to the conference input screen Da may contain multiple keywords. When multiple keywords are included in one conference name, the sum of the current evaluation values for each keyword in the related information of the potential participant may be compared to a predetermined threshold value in the determination of the suitability of potential participants. Alternatively, when the priority order is predetermined for the keywords of the keyword DB 420, the current evaluation value of the key-word having the highest priority among the keywords may be compared. That is, for example, when the "keyword 1" and the "keyword 2" stored in the keyword DB 420 are included in the conference name, it is assumed that the "keyword 2" has a higher priority than the "keyword 1." In such a case, the current evaluation value of "Keyword 2" is compared to the predetermined threshold value in the determination of the potential participants.

(3) The word indicating the classification of the conference is not limited to the conference name, but may be included in the subject (subtitle) that represents the outline of the conference. In such a case, the terminal 10 accepts the input of the conference name and the subject on the conference input screen Da, and sends the inquiry information including the conference name, the subject, and the potential participants to the server 20. The server 20 extracts a keyword from the conference name and the subject in the inquiry information and performs the determination process. When different keywords are included in the conference name and the subject, the sum of the current evaluation values of the respective keywords may be compared to a predetermined threshold value. Alternatively, the current evaluation value of the keyword included in a predetermined one of the conference name and the subject may be compared to a predetermined threshold value with priority.

(4) The evaluation value of each keyword in the related information may be calculated by using a coefficients other than the coefficients (1.0 and 0.9) described in the embodiments. The evaluation value of each keyword in the related information may be set on the basis of the rate of the keyword appearing in the conference name among the participating conference in which members are registered as conference participants. For example, if the conference names including the keywords "project X," "project Y," and "project Z" respectively appear in conference names of ten participating conferences six times, three times, and one time, the evaluation values of the keywords may be "0.6," "0.3," and "0.1," respectively.

The invention claimed is:

1. A conference support apparatus comprising:
one or more processors; and
one or more memories storing instructions that, when executed by the one or more processors, cause the one or more processors to:
acquire, for each of a plurality of predetermined members, related information including an evaluation value representing association between a predefined word representing a classification of a conference and the corresponding predetermined member;
accept input of information regarding a conference to be held and a member selected from the plurality of the predetermined members as a potential participant of the conference to be held;
determine whether or not the member who is the potential participant is suitable as a conference participant of the conference to be held based on the acquired related information corresponding to the potential participant and the accepted input of the information regarding the conference to be held;
output a determination result; and
store, at the memory, at least the related information, wherein
the information regarding the conference to be held includes a conference name,
the evaluation value for each predefined word is weighted in accordance with whether or not the predefined word is included in a conference name of a conference in which the member has been input as a participant of a conference in the past, and the instructions, when executed by the one or more processors, further cause the one or more processors to determine that the member who is the potential participant is unsuitable when the weighting of a word corresponding to the conference name of the conference to be held is equal to or less than a predetermined threshold value.

2. The conference support apparatus according to claim 1, wherein, the instructions, when executed by the one or more processors, further cause the one or more processors to:

accept participant registration to register the potential participant as a participant of the conference to be held; and update, when the participant registration is accepted, the evaluation value of the predefined word in the related information corresponding to the member who is the potential participant.

3. The conference support apparatus according to claim 1, wherein the instructions, when executed by the one or more processors, further cause the one or more processors to:

select the potential participant from the predetermined members based on the weighting of the word corresponding to the conference name in the related information of each predetermined member when input of the conference name is accepted;

and outputs a selection result.

4. The conference support apparatus according to claim 2, wherein the instructions, when executed by the one or more processors, further cause the one or more processors to:

select the potential participant from the predetermined members based on the weighting of the word corresponding to the conference name in the related information of each predetermined member when input of the conference name is accepted; and outputs a selection result.

5. A method of supporting a conference, the method comprising:

acquiring, for each of a plurality of predetermined members, related information including an evaluation value representing association between a predefined word representing a classification of a conference and the corresponding predetermined member;

accepting input of information regarding a conference to be held and a member selected from the plurality of the predetermined members as a potential participant of the conference to be held;

determining whether or not the member who is the potential participant is suitable as a conference participant of the conference to be held based on the acquired related information corresponding to the potential participant accepted as input and the information regarding the conference to be held accepted as input;

outputting a determination result obtained in the determination; and storing at least the related information, wherein the information regarding the conference to be held includes a conference name, the evaluation value for each predefined word is weighted in accordance with whether or not the predefined word is included in a conference name of a conference in which the member has been input as a participant of a conference in the past, and in the determining, the member who is the potential participant is determined to be unsuitable when the weighting of a word corresponding to the conference name of the conference to be held is equal to or less than a predetermined threshold value.

6. A non-transitory computer-readable recording medium storing a conference support program for causing a computer to execute a process, the process comprising:

acquiring, for each of a plurality of predetermined members, related information including an evaluation value representing association between a predefined word representing a classification of a conference and the corresponding predetermined member;

accepting input of information regarding a conference to be held and a member selected from the plurality of the predetermined members as a potential participant of the conference to be held;

determining whether or not the member who is the potential participant is suitable as a conference participant of the conference to be held based on the acquired related information corresponding to the potential participant accepted as input and the information regarding the conference to be held accepted as input;

outputting a determination result; and storing at least the related information, wherein the information regarding the conference to be held includes a conference name, the evaluation value for each predefined word is weighted in accordance with whether or not the predefined word is included in a conference name of a conference in which the member has been input as a participant of a conference in the past, and in the determining, the member who is the potential participant is determined to be unsuitable when the weighting of a word corresponding to the conference name of the conference to be held is equal to or less than a predetermined threshold value.

* * * * *